US012711803B1

(12) United States Patent
Chhabra et al.

(10) Patent No.: US 12,711,803 B1
(45) Date of Patent: Aug. 18, 2026

(54) SYSTEM FOR BIOMETRIC INPUT ASSESSMENT

(71) Applicant: AMAZON TECHNOLOGIES, INC., Seattle, WA (US)

(72) Inventors: Saheb Chhabra, Pratapgarh (IN); Rui Zhao, Bellevue, WA (US); Manoj Aggarwal, Seattle, WA (US); Gerard Guy Medioni, Los Angeles, CA (US); Vishal Kaushal, Bengaluru (IN)

(73) Assignee: Amazon Technologies, Inc., Seattle, WA (US)

( * ) Notice: Subject to any disclaimer, the term of this patent is extended or adjusted under 35 U.S.C. 154(b) by 336 days.

(21) Appl. No.: 18/337,936

(22) Filed: Jun. 20, 2023

(51) Int. Cl.
*G06V 40/12* (2022.01)
*G06V 10/77* (2022.01)
*G06V 10/774* (2022.01)
*G06V 10/82* (2022.01)

(52) U.S. Cl.
CPC ...... *G06V 40/1353* (2022.01); *G06V 10/7715* (2022.01); *G06V 10/774* (2022.01); *G06V 10/82* (2022.01)

(58) Field of Classification Search
CPC ....................... G06V 40/1353; G06V 10/7715
See application file for complete search history.

(56) References Cited

U.S. PATENT DOCUMENTS

2003/0169910 A1* 9/2003 Reisman ............ G06V 40/1365 382/124
2016/0063300 A1* 3/2016 Du ..................... G06V 40/1394 382/124
2016/0381003 A1* 12/2016 Caceres ............. H04L 63/0861 713/156
2019/0392189 A1* 12/2019 Kumar .................. G06V 10/80
(Continued)

OTHER PUBLICATIONS

A. K. Jain and A. Ross, "Learning user-specific parameters in a multibiometric system," Proceedings. International Conference on Image Processing, Rochester, NY, USA, 2002, pp. I-I, doi: 10.1109/ICIP.2002.1037958. (Year: 2002).*
(Continued)

*Primary Examiner* — Stephen R Koziol
*Assistant Examiner* — Ashley Hytrek
(74) *Attorney, Agent, or Firm* — Weaver Austin Villeneuve & Sampson LLP

(57) ABSTRACT

A machine learning network is trained to determine quality metrics of biometric input data. The quality metrics may include an estimated minutiae density, estimated feature point density, and so forth. Quality metrics are compared to threshold values to determine if the biometric input data is suitable for use. Different thresholds may be specified for enrollment and identification. A multi-branch machine learning network architecture may be used, with a first portion determining embedding data, and additional portions determining various quality metrics, such as the estimated minutiae density and estimated feature point density. This archi-
(Continued)

tecture substantially reduces latency in determining quality metrics. Biometric input data processed by the network may comprise an entire image, or patches of the image. Data associated with one or more of different images or different patches may be aggregated to determine embedding data used for identification. Aggregation may be based on the quality metrics.

20 Claims, 8 Drawing Sheets

(56) References Cited

U.S. PATENT DOCUMENTS

| | | | | |
|---|---|---|---|---|
| 2020/0151988 | A1* | 5/2020 | Harding | G07C 9/37 |
| 2024/0233444 | A1* | 7/2024 | Aggarwal | G06V 40/14 |

OTHER PUBLICATIONS

Zhu, Le-qing, and San-yuan Zhang. "Multimodal biometric identification system based on finger geometry, knuckle print and palm print." Pattern Recognition Letters 31, No. 12 (2010): 1641-1649. (Year: 2010).*

D.-L. Nguyen, K. Cao and A. K. Jain, "Robust Minutiae Extractor: Integrating Deep Networks and Fingerprint Domain Knowledge," 2018 International Conference on Biometrics (ICB), Gold Coast, QLD, Australia, 2018, pp. 9-16, doi: 10.1109/ICB2018.2018.00013. (Year: 2018).*

Chugh, Tarang, and Anil K. Jain. "Fingerprint presentation attack detection: Generalization and efficiency." In 2019 International Conference on Biometrics (ICB), pp. 1-8. IEEE, 2019. (Year: 2019).*

Uhl, Andreas, Christoph Busch, Sébastien Marcel, and Raymond Veldhuis. Handbook of vascular biometrics. Springer Nature, 2020. (Year: 2020).*

B. Ding et al., "Surface and Internal Fingerprint Reconstruction From Optical Coherence Tomography Through Convolutional Neural Network," in IEEE Transactions on Information Forensics and Security, vol. 16, pp. 685-700, 2021, doi: 10.1109/TIFS.2020.3016829. (Year: 2021).*

Aguado-Martínez, M., Hernández-Palancar, J. (2018). Speeding up High Resolution Palmprint Matching by Using Singular Points. Progress in AI and Pattern Recognition. IWAIPR 2018. Lecture Notes in Computer Science(), vol. 11047. Springer, Cham. https://doi.org/10.1007/978-3-030-01132-1_10 (Year: 2018).*

Sabri, Mohammad, Mohammad-Shahram Moin, and Farbod Razzazi. "A new framework for match on card and match on host quality based multimodal biometric authentication." Journal of Signal Processing Systems 91, No. 2 (2019): 163-177. (Year: 2019).*

Dahea, Waleed, and H. S. Fadewar. "Multimodal biometric system: A review." International Journal of Research in Advanced Engineering and Technology 4, No. 1 (2018): 25-31. (Year: 2018).*

Haraksim R., Galbally J., Beslay L., Study on Fingermark and Palmmark Identification Technologies for their Implementation in the Schengen Information System. EUR 29755 EN, Publication office of the European Union, Luxembourg, 2019, ISBN 978-92-76-03975-4, doi:10.2760/852462, JRC116442. (Year: 2019).*

A. Takahashi, Y. Koda, K. Ito and T. Aoki, "Fingerprint Feature Extraction by Combining Texture, Minutiae, and Frequency Spectrum Using Multi-Task CNN," 2020 IEEE International Joint Conference on Biometrics (IJCB), Houston, TX, USA, 2020, pp. 1-8, doi: 10.1109/IJCB48548.2020.9304861. (Year: 2020).*

Gupta, Keshav, Gurjit Singh Walia, and Kapil Sharma. "Quality based adaptive score fusion approach for multimodal biometric system." Applied Intelligence 50, No. 4 (2020): 1086-1099. (Year: 2020).*

H. Zhao and S. Zheng, "A Morphological Fingerprint Minutiae Annotation Algorithm for Deep Learning Datasets, " 2022 IEEE International Symposium on Circuits and Systems (ISCAS), Austin, TX, USA, 2022, pp. 1294-1298, doi: 10.1109/ISCAS48785.2022.9937790. (Year: 2022).*

Oblak T, Haraksim R, Beslay L, Peer P. Probabilistic fingermark quality assessment with quality region localisation. Sensors. Apr. 15, 2023;23(8):4006. (Year: 2023).*

U. Sumalatha, K. K. Prakasha, S. Prabhu and V. C. Nayak, "A Comprehensive Review of Unimodal and Multimodal Fingerprint Biometric Authentication Systems: Fusion, Attacks, and Template Protection," in IEEE Access, vol. 12, pp. 64300-64334, 2024, doi: 10.1109/ACCESS.2024.3395417. (Year: 2024).*

"NIST Biometric Image Software (NBIS)" National Institute of Standards and Technology, U.S. Department of Commerce, Feb. 10, 2010, 7 pages. Retrieved from the Internet: URL: https://www.nist.gov/services-resources/software/nist-biometric-image-software-nbis.

Busch, et al., "NFIQ2—Features and Concepts", NFIQ2 Workshop, Jun. 15, 2021, 47 pages. Retrieved from the Internet: URL: https://eab.org/files/events/02_Christoph_Busch_HDA_210615.pdf.

Detone, et al., "SuperPoint: Self-Supervised Interest Point Detection and Description", Apr. 19, 2018, 13 pgs. Retrieved from the Internet: URL: https://arxiv.org/abs/1712.07629.

Draelos, Rachel, "Squeeze-and-Excitation Networks: Channel self-attention to improve CNN performance" Channel self-attention to improve CNN performance, Published in Towards Data Science, 21 pgs. Retrieved from the Internet: URL: https://towardsdatascience.com/squeeze-and-excitation-networks-fb91e7f64096.

Hu, et al., "Squeeze-and-Excitation Networks", 13 pgs. Retrieved from the Internet: URL: architecarXiv:1709.01507v4 [cs.CV] 16.

Xue, et al., "IR2Net: Information Restriction and Information Recovery for Accurate Binary Neural Networks," 11 pgs, Retrieved from the Internet: URL: arXiv:2210.02637v1 [cs.CV] Oct. 6, 2022.

* cited by examiner

FIG. 1

SYSTEM FOR BIOMETRIC INPUT ASSESSMENT

BACKGROUND

Biometric data may be used for recognition of an individual.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 1 illustrates a system to process biometric input and determine biometric identification data, according to some implementations.

Figure 2:
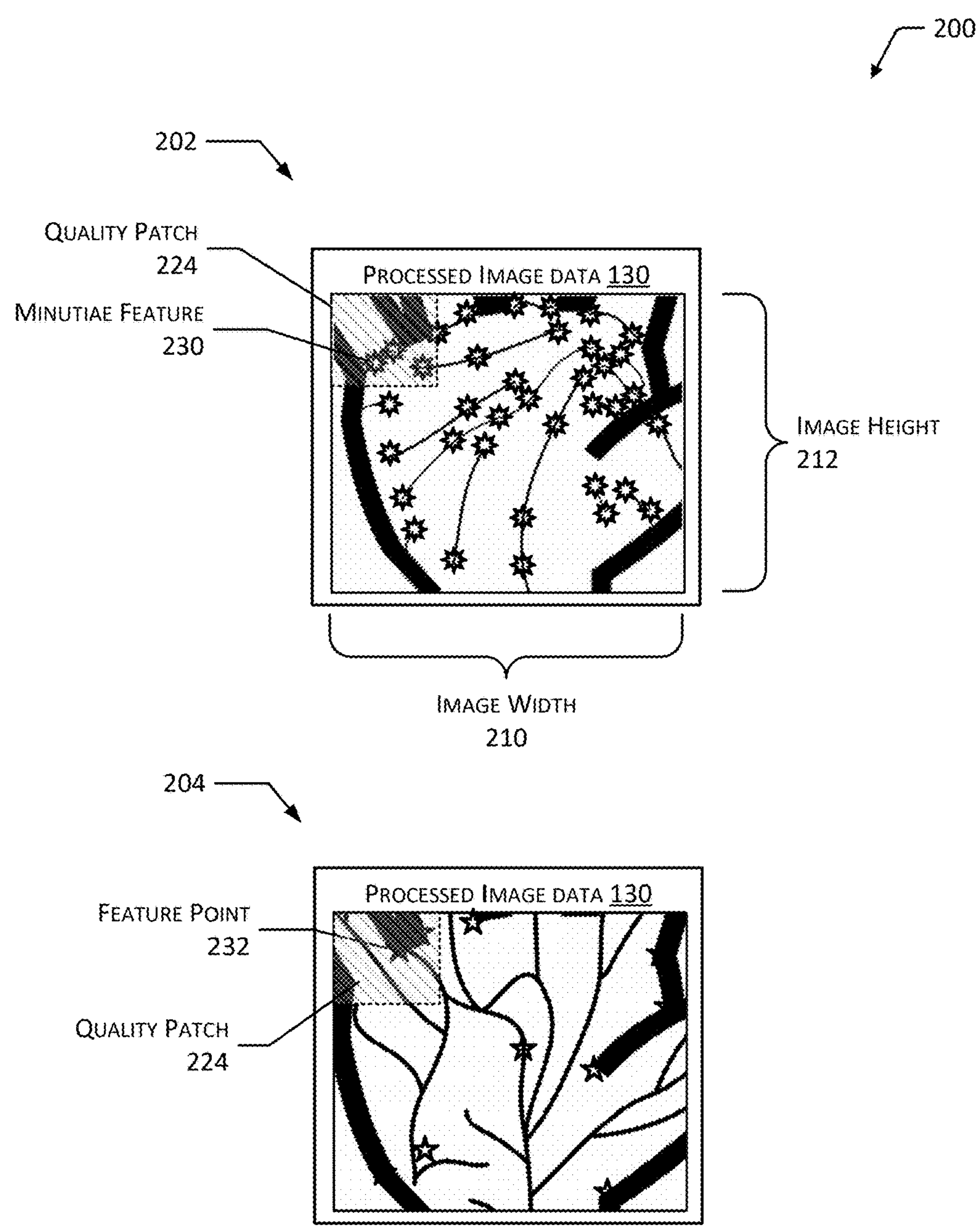
FIG. 2 illustrates minutiae features and feature points in biometric input, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Accurate and fast biometric identification of a user may be used in a variety of ways. For example, entry to a materials handling facility (facility), office, transportation facility, or other location may be controlled based on user identity. As the user enters the facility, the user may be identified using the devices and techniques described herein. In another example, a point-of-sale system may use the devices and techniques described herein to identify a user and determine a payment account to be used for goods or services.

Traditional systems for identifying users suffer from several significant drawbacks, including susceptibility to fraud, lack of speed, inaccuracy, and operational limitations. For example, a traditional system to identify a user by presenting a token, such as an identification card, may be used by someone other than an authorized user. As a result, systems that involve only the use of "something you have" are vulnerable to misuse. Biometric identification deals with this by using a characteristic of the particular individual that is considered difficult or impossible to copy or be transferred.

Input data, such as used for biometric identification, may be acquired using one or more modalities. For example, a first modality may comprise images of surface skin of a user's hand (or a portion thereof such as the palm) while a second modality may comprise images of subcutaneous features such as veins of the user's hand (or portion thereof). The use of multi-modality input data provides several advantages for biometric identification.

The quality of input data may be affected by various factors. Some factors are associated with variations associated with acquisition of the image. For example, the pose of the hand relative to a scanner that is acquiring the input data, motion of the hand during acquisition, illumination of the hand during acquisition, and so forth may all affect the quality of the input data. Other factors that may affect the quality of the input data include the presence of obscurants such as dirt, cosmetics, ink, and so forth on the hand during acquisition, and so forth.

Accuracy of a biometric identification system is substantially improved if the input data is of sufficient quality. For example, a high-quality image of the user's hand provides more information for subsequent processing, improving the accuracy of subsequent processing. As a result, the ability to quantify the quality of the input data and use this information in processing provides substantial benefits to the users.

The quality of the input data may be specified in various ways that are associated with the modality. For example, characteristics of images may be assessed to determine the quality of images. The quality of an image may be based on if the sought after portion of the user, such as the palm, is actually present in the image. For example, an image of the back of the user's hand may be deemed to be of insufficient quality in a system that processes features on the palm of the hand. The quality of an image may be based on if the image is in focus, illuminated evenly, and so forth. For example, an image of the user's palm that is blurred or too dark may be deemed to be of insufficient quality for further processing.

Traditional techniques of quality assessment involve various algorithms that deterministically assess input data. For example, algorithms that determine an orientation certainty level (OCL), frequency domain analysis to calculate a mean and standard deviation, and so forth may be used to assess input data. However, these approaches exhibit several disadvantages. Some techniques may be highly sensitive to relatively small changes in the input images or processing performed on those images. For example, a change in a compression algorithm used, or the parameters of the same algorithm, may result in incorrect output.

Existing algorithms to calculate quality may also be computationally intensive. This limits their use on a resource constrained device, such as at a point of sale or entry to a facility. Existing quality algorithms may also introduce latency in the process. For example, performing the calculations associated with existing algorithms may introduce substantial delay.

Described in this disclosure are techniques to determine quality of biometric input data using a trained machine learning network. The quality metrics estimated may include an estimated minutiae density, estimated feature point density, or estimates of other metrics.

The quality metrics are then compared to threshold values to determine if the biometric input data is suitable for use. Different thresholds may be specified for enrollment and identification. For example, higher thresholds of minutiae density and feature point density may be specified for enrollment, compared to later identification.

The machine learning network may comprise a portion or branch of another machine learning network. For example, a machine learning network trained to determine embedding data that is subsequently used to distinguish one enrolled user from another may have an additional branch that is trained to determine the quality metrics or other metric data. This results in substantial reductions in computational resource usage and latency during operation.

Biometric input data processed by the machine learning network may comprise an entire image, or patches of the image. In various implementations, the entire image or individual patches may be processed to determine quality data and associated embedding data. Data associated with one or more of different images or different patches may be aggregated to determine embedding data used for identification. Aggregation may be based on the quality metrics. For example, images or patches that have quality metrics less than specified threshold values may be discarded from further processing.

By using the techniques described in this disclosure, the biometric identification system is able to substantially improve overall accuracy, is robust to changes in the input data, and improves overall performance. Accuracy is improved by processing data that meets specified quality threshold values. The system is robust to changes in the processing pipeline, such as the use of different compression algorithms to compress the input data. The estimation of the quality metrics using the trained machine learning network exhibits lower latency than conventional techniques, improving the user experience. The reduction in time associated with processing each user is reduced, providing an improvement in throughput at each input device. The techniques are computationally efficient and may be combined with existing processes to provide an overall decrease in the usage of computational resources.

Illustrative System

Figure 1:
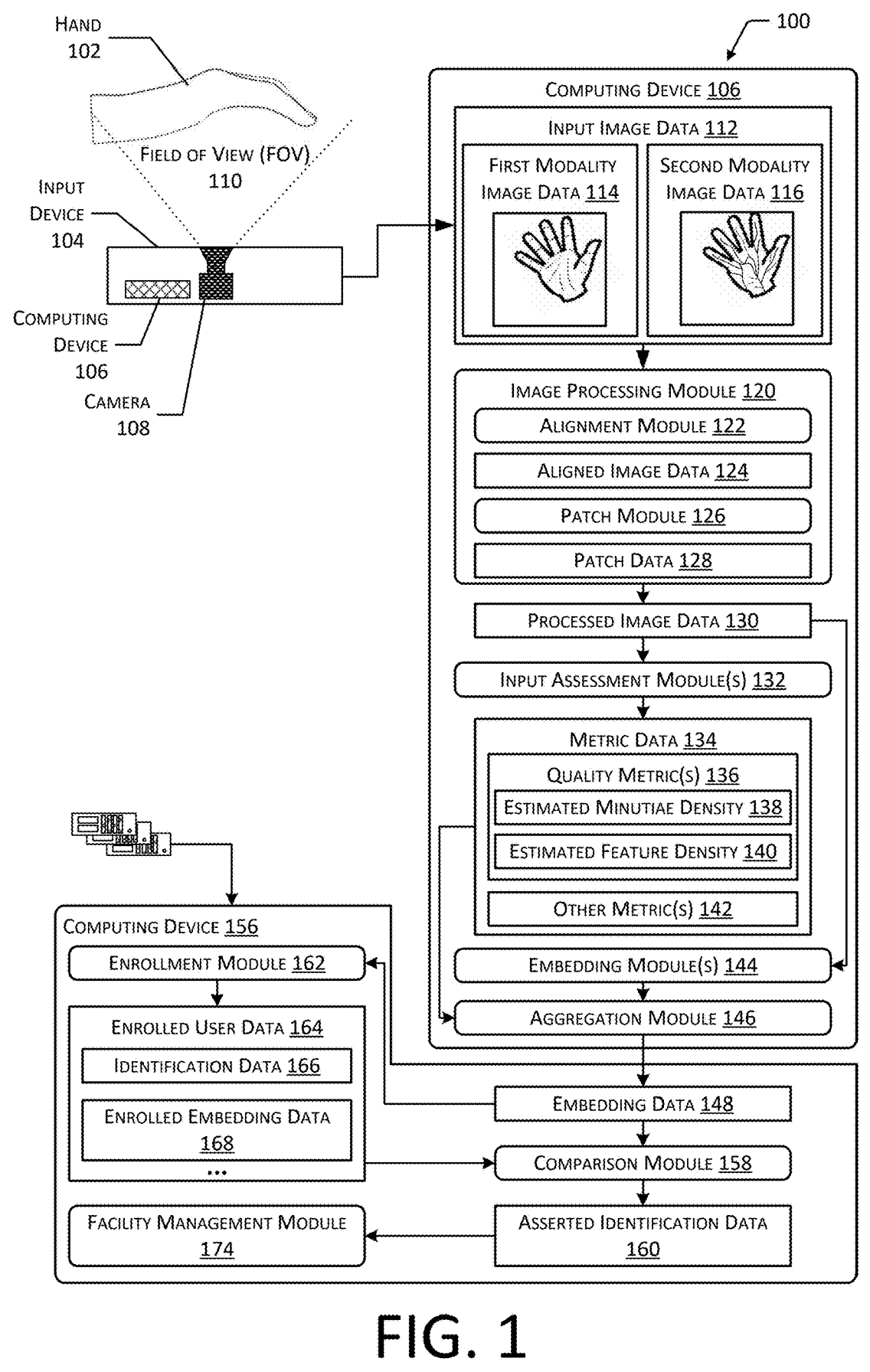

FIG. 1 illustrates a system 100 in which a hand 102 of a user is depicted positioned above an input device 104. The input device 104 may include a computing device 106 and a camera 108. The camera 108 has a field of view (FOV) 110. During operation of the input device 104, the camera 108 acquires images of an object in the FOV 110, such as the hand 102, and provides input image data 112 obtained using two or more modalities. The input device 104 may include other components which are not shown. For example, the input device 104 may include lights that illuminate the object in the FOV 110. In another example, the input device 104 may include lights, a display screen, speaker, or other output device that provides instructions, prompts, or other information to the user.

In the implementation depicted, the hand 102 is held above the camera 108, with the FOV 110 extending upward. For example, during operation the user may present their hand 102 with the palm or volar region of the hand toward the input device 104. As a result, the input image data 112 provides an image of the anterior portion of the hand 102. In other implementations, the input image data 112 may include the back of the hand 102. In other implementations, other configurations may be used. For example, the camera 108 may have the FOV 110 extending downwards, and the user may place their hand 102 in the FOV 110 under the input device 104.

The input device 104 may acquire images of the hand 102 using one or more modalities. A first modality may acquire images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include creases, wrinkles, scars, dermal papillae ridges, and so forth in at least the epidermis of the hand 102.

Second modality features comprise those features that are below the epidermis. The second modality may acquire images in which the hand 102 is illuminated with light having a second polarization and obtained by the camera 108 with the polarizer passing light to the camera 108 with the first polarization. For example, the second modality features may include anatomical structures such as veins, bones, soft tissue, or other sub-surface features. Some features may be visible in both first modality and second modality images. For example, a crease in the palm may include first modality features on the surface as well as deeper second modality features within the palm.

Separate images of the first and second modalities may be acquired using different combinations of polarized light provided by infrared lights. In this illustration, the input image data 112 comprises first modality image data 114 and second modality image data 116. The first modality image data 114 and the second modality image data 116 of the same hand may be acquired in rapid succession with respect to one another. For example, the camera 108 may operate at 60 frames per second and acquire the first modality image data 114 in a first frame and the second modality image data 116 in a second frame.

The user may place their hand 102 within the FOV 110 in various poses, distances, translations, and so forth. While in the FOV 110, the hand 102 may move as well. The pose of the hand 102 may indicate the rotation of the hand 102 relative to the camera 108 and the articulation of the joints in the hand 102. For example, the pose may be that the hand 102 is rotated with a yaw of −2 degrees, pitch of +5 degrees, and roll of −7 degrees and an articulation in which the fingers are together. The distance may comprise the distance between the camera 108 and the hand 102. For example, the distance may vary from zero in which the hand 102 is in contact with the input device 104 to several meters in which the hand 102 may be too far away for a useful image to be acquired. The translation indicates the apparent position of the hand 102 in a plane that is perpendicular to an optical axis extending away from the camera 108. For example, if the hand 102 is not centered directly above the camera 108, the resulting input image data 112 may show the hand 102 to be translated away from the center of the input image.

In the implementation depicted here, the input device 104 does not include a guide, scan plate, or other structure that constrains the pose or position of the hand 102. For example, the user may move their hand 102 within the FOV 110 freely, rotating, translating, changing articulation, and so forth without constraint. As a result, the appearance of the hand 102 in the input image data 112 may vary due to changes in articulation, pose, distance, translation, and so forth.

In another implementation, the input device 104 may include a structure such as a guide or scan plate to constrain at least some movement of the hand 102. For example, the scan plate may comprise a flat pane of glass which the hand 102 may rest upon, and the camera 108 may then acquire an image. However, even in the situations involving the guide, the user 102 may not be fully constrained. For example, the user may place their hand 102 in different articulations such as fingers together, fingers apart, and so forth. The user may also fail to place their hand 102 in the preferred position with regard to the guide, for example only having an edge of their hand 102 in contact with the scan plate while the rest is elevated producing a rotation of the hand 102 with respect to the camera 108. As a result, the input image data 112 may vary considerably, even with the structure to guide the user's hand 102.

In other implementations the input image data 112 and the system 100 may utilize biometric information about other features of the user. For example, the input image data 112 may comprise images of the user's face, ears, overall image of the user, and so forth.

An image processing module 120 may receive the input image data 112 and perform additional processing to provide processed image data 130 as output. An alignment module 122 may accept the input image data 112 comprising a plurality of images as input and provide as output aligned image data 124. In one implementation the alignment module 122 may be configured to align overall elements of the image without rotating the contents of the image. For example, the alignment module 122 may perform one or more operations such as enlarging or reducing the image size, translating, or rotating one image with respect to another. The images may be deemed to be aligned when a pixel having the same coordinates (row and column) in the first modality image data 114 are associated with the same spatial region of the hand 102 as depicted in the second modality image data 116.

In some implementations, the image processing module 120 may include a canonical image module. The canonical image module accepts input such as the input image data 112 or the aligned image data 124, and provides as output canonical image data. In some implementations the canonical image module may comprise a machine learning network that has been trained to generate canonical image data as output. The canonical image data represents the input with one or more of a predetermined pose relative to the camera 108 of the input device 104, predetermined articulation of the hand 102, predetermined illumination, predetermined scale, or other characteristic. For example, the input image data 112 may depict the hand 102 of the user slightly tilted and off-center relative to the FOV 110, with the fingers together. In another example, the input image data 112 may depict the hand 102 of the user only filling a portion of the image. By scaling the input image data 112, the hand 102 may appear to be a predetermined width within the image. The canonical image data may depict the same hand in a canonical pose with no tilt and centered in the image, a canonical articulation in which the fingers are splayed apart, with the hand filling the image frame, and so forth.

In some implementations, the image processing module 120 may include a patch module 126. The patch module 126 accepts input and determines as output patch data 128(1)-(N). For example, the patch module 126 may use previously stored patch coordinate data to designate a particular portion of the processed image data 130 as being associated with a particular quality patch 224 or embedding patch 324. The patch data 128 comprises a subset of the input. For example, if the aligned image data 124 is provided to the patch module 126, the patch data 128 is a subset of the aligned image data 124. The patch module 126 is discussed in more detail with regard to FIG. 3.

The image processing module 120 may apply one or more filters or perform other image processing to the input image data 112 or data based thereon, such as the aligned image data 124, canonical image data, patch data 128, and so forth.

The processed image data 130 is provided to one or more modules. As described in more detail with regard to the following figures, different portions of a single machine learning network may implement the functions of these modules.

One or more input assessment modules 132 determine metric data 134. The metric data 134 may comprise one or more quality metrics 136 or other data 142. The quality metrics 136 may comprise one or more of estimated minutiae density 138, estimated feature density 140, and so forth. The quality metrics 136 are estimated in that they are determined by processing the input with a machine learning network that is trained to estimate their values. In contrast, a metric value may be determined by calculation using a deterministic algorithm. During training, the machine learning network may be trained using training data that includes labels indicative of the metrics calculated using the deterministic algorithm. This is discussed in more detail with regard to FIG. 4.

The density with regard to a metric value may be determined as follows with regard to image input having a width in pixels and height in pixels. The image may be divided into non-overlapping quality patches 224(1)-(Q). Each quality patch 224 containing greater than a threshold number of points of interest is determined. For example, each quality patch 224 that contains one or more point of interest such as a minutia point or feature point is determined. A total area of patches determined to contain greater than the threshold number of points of interest is determined. A total area of the image is determined. The density is the total area of patches divided by the total area.

In some implementations, the metric data 134 that is estimated may be an estimate of a composite of several metrics. For example, the metric data 134 may comprise a single composite value that is calculated based on minutiae density, feature density, and so forth.

The other data 142 may comprise other information about the processed image data 130. For example, the other data 142 may include presentation attack detection data indicative of whether the hand 102 that is depicted is deemed to be an artifact or an actual human hand. In another example, the other data 142 may comprise a mismatch detection metric, indicative of whether the first modality image data 114 and the second modality image data 116 are deemed to be associated with the same hand 102.

One or more embedding module(s) 144 accept processed image data 130 as input and determine instance embedding data 526 as output. The instance embedding data 526 is discussed in more detail with regard to FIG. 5. The embedding module 144 comprises a trained machine learning network, or a portion thereof, that determines embedding data 148 as output. The embedding data 148 is representative of one or more features in the processed image data 130.

In some implementations, several instances of embedding data 526 may be determined and provided as input to an aggregation module 146. The embedding module 144 is discussed in more detail below with regard to FIG. 5.

The aggregation module 146 determines embedding data 148 based on inputs such as one or more instances of embedding data 526 and associated quality metrics 136. For example, the aggregation module 146 may disregard instances of embedding data 526 that have associated quality metrics 136 less than threshold values. The aggregation module 146 comprises a trained machine learning network, or a portion thereof, that determines the embedding data 148 as output. The aggregation module 146 is discussed in more detail with regard to FIG. 5.

In the implementation shown in FIG. 1, one or more of the image processing module 120, the input assessment modules 132, or the embedding module 144 is executed on the computing device 106 of the input device 104. The computing device 106 may perform other functions, such as encryption and transmission of the input image data 112 or data based thereon.

In another implementation, a computing device 156 may execute one or more of the image processing module 120, the input assessment modules 132, the embedding module 144, or other modules described herein.

The system may be used in various ways, such as enrollment to add a new user and identification to try to ascertain the identity of a hand 102 that has been presented.

During enrollment, users are able to utilize the system 100 by performing an enrollment process. An enrollment module 162 may coordinate the enrollment process. Enrollment may associate biometric information, such as embedding data 148 with particular information such as a name, account number, and so forth.

During the enrollment process, the user opts in and presents their hand 102 to the input device 104. The input device 104 determines the input image data 112 that is then processed by the image processing module 120 to determine the processed image data 130 that is then processed by the input assessment module(s) 132 to determine metric data 134 and the embedding module(s) 144 to determine the embedding data 148.

During the enrollment process, the embedding data 148 may be processed by a comparison module 158 to determine whether the user has been previously enrolled. For example, the process described below with regard to "identification time" may be used to compare query embedding data 148 with previously enrolled user data 164. A successful enrollment may comprise storage of enrolled user data 164 comprising identification data 166, such as name, telephone number, account number, and so forth. In some implementations, the enrolled user data 164 may comprise one or more of embedding data 148 or data based thereon as enrolled embedding data 168.

During the enrollment process, once the user has been determined to not have been previously enrolled, the system 100 may proceed to acquire biometric input data, such as one or more instances of biometric image data such as input image data 112 or data based thereon such as embedding data 148. In some implementations, during enrollment the biometric input data such as input image data 112 that is processed to determine the enrolled embedding data 168 may be processed differently or using constraints compared to during identification. For example, during enrollment threshold values for quality metrics 136 may be greater than thresholds used during identification, such that high quality biometric input data is acquired and used.

During identification the (as yet unidentified) user presents their hand 102 at the input device 104. The resulting input image data 112 is processed as described to determine query embedding data 148.

The query embedding data 148 may then be compared by a comparison module 158 to previously stored data, such as the enrolled embedding data 168 to determine asserted identification data 160. In one implementation, the asserted identification data 160 may comprise a user identifier associated with the closest, in one or more embedding space(s), to previously stored enrolled embedding data 168 relative to the query embedding data 148 associated with the user who presented their hand 102 during identification time. The comparison module 158 may utilize other considerations, such as requiring that the query embedding data 148 is no more than a maximum distance in the embedding space from the enrolled embedding data 168 of a particular user before determining the asserted identification data 160.

The asserted identification data 160 may then be used by subsequent systems or modules. For example, the asserted identification data 160, or information based thereon, may be provided to a facility management module 174.

While the input image data 112 and subsequent process is described with respect to using two or more modalities, in some implementations the system 100 may operate using a single modality.

The facility management module 174 may use the asserted identification data 160 to associate an identity with the user as they move about a facility. For example, the facility management module 174 may use data from cameras or other sensors in the environment to determine a location of the user. Given a known path of the user from an entrance that utilizes the input device 104, the user identity indicated in the identification data 166 may be associated with the user as they use the facility. For example, the now identified user may walk to a shelf, remove an item, and leave the facility. The facility management module 174 may determine the interaction data indicative of the removal of the item as being associated with the user identifier specified in the asserted identification data 160, and bill an account associated with the user identifier. In another implementation, the facility management module 174 may comprise a point-of-sale system. The user may present their hand 102 at checkout to assert their identity and pay using a payment account that is associated with their identity.

The systems and techniques described above are discussed with respect to images of human hands. These systems and techniques may be used with respect to other forms of data, other kinds of objects, and so forth. For example, these techniques may be used for facial recognition systems, iris recognition systems, voice recognition systems, object recognition systems, and so forth. For example, biometric input data may comprise one or more modalities such as images, fingerprint data, audio data, motion data, depth data, or other data that is representative of one or more features of the user. The image data may comprise images of a user or a portion thereof such as a hand 102, face, iris, fingertip, and so forth. The image data may be acquired using various techniques to produce modalities such as surface features, subcutaneous features, thermal features, and so forth. The fingerprint data may comprise data acquired using a fingerprint sensor, such as an imaging sensor, capacitive sensor, and so forth. The audio data may comprise audio data of the user acquired using one or more microphones. The motion data may comprise data acquired from an inertial measurement unit (IMU), such as in a wearable or portable device, that is indicative of the motion of the user. In some implementations, the motion data may comprise data extracted from other sensors such as a stereocamera, that is indicative of the motion of the user. The depth data may comprise data indicative of a distance or relative distance change between different points of the user, such as a point cloud representation. Continuing the example, the depth data may be indicative of the size and topology of at least a portion of the user.

In some implementations, the biometric input data may comprise other modalities. For example, the input device 104 may acquire biometric input data comprising audio data of the user speaking. This biometric input data may then be processed to determine embedding data 148 that is representative of the features of the audio data.

FIG. 2 illustrates at 200 minutiae features and feature points in biometric input, according to some implementations.

The quality metrics 136 determined by the input assessment modules 132 may comprise one or more of estimated minutiae density 138, estimated feature density 140, and so forth.

The image may be divided into a plurality of non-overlapping quality patches 224(1)-(Q). In some implementations, the quality patches 224(1)-(Q) may have the same dimensions, while in other implementations different quality patches 224 may have different dimensions.

Points of interest may be determined for the image. A point of interest may comprise a feature or characteristic that may be determined, such as a minutia feature 230 shown at 202 or a feature point 232 shown at 204.

In one implementation minutiae features 230 may comprise features detected by the MINDTCT algorithm promulgated by the National Institute of Standards and Technology (NIST) Biometric Image Software (NBIS). In other implementations, other algorithms may be used to determine minutiae.

A feature point 232 may be determined. The feature point 232 may be determined using various algorithms, such as a Harris corner detector, or a scale-invariant feature transform (SIFT). In some circumstances, a feature point 232 may represent a crease, wrinkle, and so forth. In some implementations the feature point 232 may be determined using a trained machine learning network.

An orientation certainty level (OCL) may be determined. The OCL may be calculated by dividing the input image into blocks, computing an intensity gradient, performing a principal component analysis, computing a covariance matrix from the gradients, and determining an eigenvalue for each block.

The density with regard to a metric value may be determined as follows with regard to image input having an image width 210 in pixels and an image height 212 in pixels.

Each quality patch 224 that contains greater than a threshold number of points of interest is determined. For example, each quality patch 224 that contains one or more points of interest is determined. A total area of patches determined to contain greater than the threshold number of points of interest is determined. For example, a count of quality patches 224 that contain one or more points of interest may be multiplied by an area of a quality patch to determine the total area. A total area of the image is determined. For example, the total area may be calculated as the image width 210 multiplied by the image height 212. The density is the total area of patches divided by the total area of the image.

In other implementations, the areas may be expressed as a count of a number of the quality patches 224. For example, if there are 36 quality patches 224, the total area may be expressed as 36. Continuing the example, if there are 7 of the quality patches 224 that contain at least one point of interest, the density would be 7/36 or about 0.194.

Figure 3:
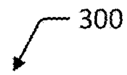
FIG. 3 illustrates portioning biometric input into patches, according to some implementations.
Figure 3:
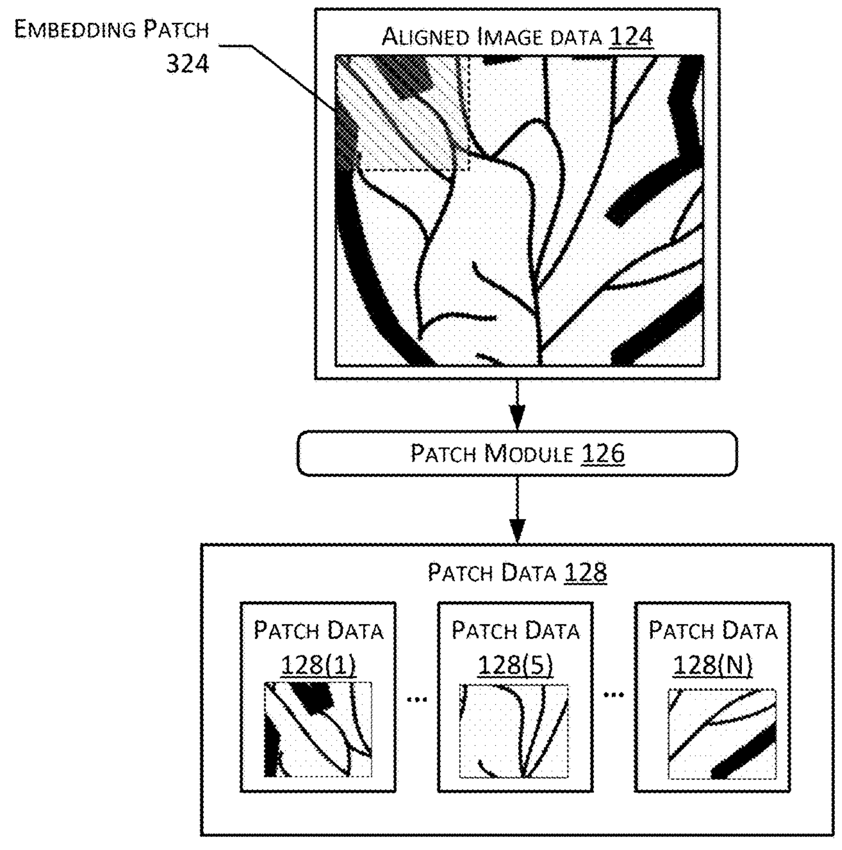

FIG. 3 illustrates at 300 portioning biometric input into patches, according to some implementations.

The patch module 126 accepts input, such as the aligned image data 124, and provides as output a set of patch data 128(1)-(N). Each instance of patch data 128 comprises data associated with a particular or predetermined spatial region, such as an area or a volume that is encompassed by an embedding patch 324. For example, each embedding patch 324 may be associated with a particular portion of the hand 102. In some implementations, boundaries of adjacent embedding patches 324 may overlap.

In some implementations, all of the embedding patches 324(1)-(N) have the same dimensions, such as the same height and width in pixels. In other implementations, different embedding patches 324 may have different sizes. By way of illustration and not as a limitation, the embedding patches 324 are depicted as square. In other implementations the embedding patches 324 may have different shapes. In some implementations the quality patches 224 and the embedding patches 324 may be the same.

Patch data 128 comprises the portion of the processed image data 130 that is associated with a particular embedding patch 324. The patch data 128 may include additional data, such as an index value that indicates which embedding patch 324 the patch data 128 is associated with.

In some implementations, individual instances of patch data 128 may be processed by the input assessment module 132 to determine metric data 134 for those individual instances.

Figure 4:
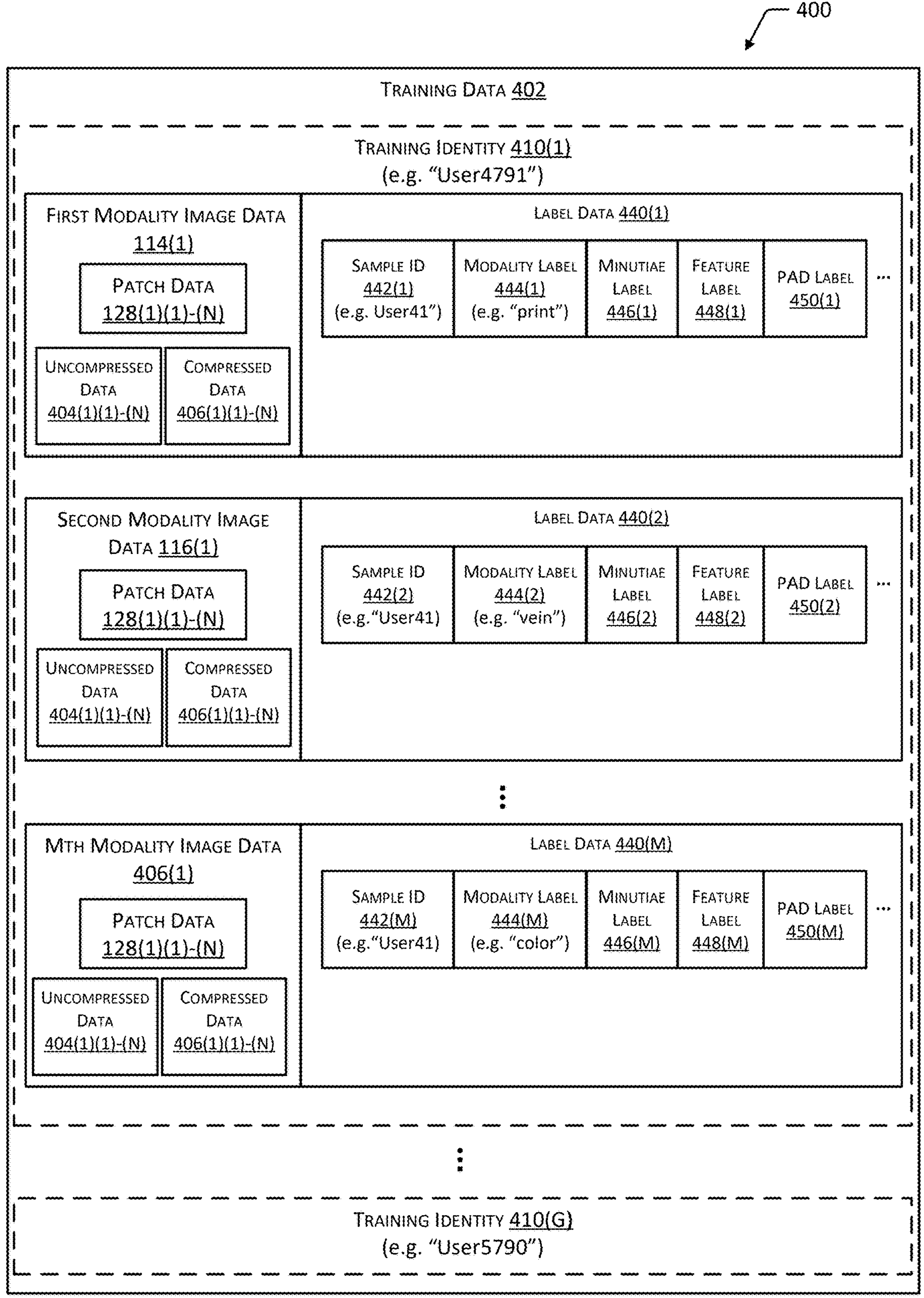
FIG. 4 illustrates training data associated with training the machine learning network, according to some implementations.

FIG. 4 illustrates at 400 training data 402 associated with training the machine learning network, according to some implementations.

The training data 402 comprises a plurality of images that may be stored as one or more of uncompressed data 404 or compressed data 406 that are representative of a plurality of training identities, 410(1), 410(2), . . . , 410(G). In some implementations a plurality of different instances of compressed data 406, such as using different compression algorithms or different compression parameters, may be used. For example, the uncompressed data 404 may be compressed using a first algorithm to determine first compressed data 406, a second algorithm to determine second compressed data 406, and so forth. Each training identity 410 is considered to be unique with respect to the other training identities 410.

The information associated with each training identity 410 may comprise actual training image data acquired from users who have opted in to provide information for training, synthetic training image data that has been generated, or a combination thereof. In one implementation, the training data 402 may exclude individuals who have enrolled to use the system for identification. For example, enrolled users having identification data 166 may be excluded from inclusion in the training data 402. In another implementation, some enrolled users may opt in to explicitly permit input image data 112 obtained during enrollment to be stored as training data 402.

The synthetic training image data may comprise synthetic data that is consistent with expected input image data 112. For example, the synthetic input data may comprise output from a generative adversarial network (GAN) that has been trained to produce synthetic images of a user's hand 102. In some implementations, the synthetic input data may be based on actual input data. In other implementations, other techniques may be used to determine the synthetic input data.

Each training identity 410(1)-410(G) includes modality image data. In some implementations patch data 128 may be stored instead of, or in addition to, the modality image data. Label data 440 is associated with the modality image, uncompressed data 404, compressed data 406, or associated patch data 128.

The label data 440 may comprise information such as a sample identifier (ID) 442, modality label 444, and so forth. The sample ID 442 indicates a particular training identity. The sample ID 442 may be used to distinguish one training identity 410 from another. In implementations where actual input data is used as part of the training data 402, the sample ID 442 may be assigned independently of the actual identification data 166 associated with that user. For example, the sample ID 442 may have a value of "User4791" and not the actual identity of "Bob Patel". The modality label 444 indicates whether the associated image data is representative of a first modality, second modality, and so forth.

A minutia label 446 comprises information indicative of the minutiae data for the associated image data. For example, the minutiae label 446 may comprise a set of minutiae features 230. In some implementations, the minutiae label 446 may comprise a minutiae density value that has been calculated for the associated image data.

A feature label 448 comprises information indicative of the feature data for the associated image data. For example, the feature label 448 may comprise a set of feature points 232. In some implementations, the feature label 448 may comprise a feature density value that has been calculated for the associated image data.

A PAD label 450 comprises information about the presentation attack detection (PAD), and is indicative of whether the associated image data is an artifact or an actual human hand.

A patch label may comprise information that indicates which embedding patch 324 the data is associated with. For example, the patch label may comprise an index value that indicates which embedding patch 324 the patch data 128 is associated with.

Other labels may also be associated with the data.

In this illustration, each training identity 410(1)-410(G) includes first modality image data 114(1) and associated sample ID 442(1) and modality label 444(1), and second modality image data 116(1) and associated sample ID 442(2) and modality label 444(2). As used in this disclosure with respect to reference numbers, a letter within parenthesis may represent a nonzero positive integer value. For example, the training data 402 may comprise a nonzero positive integer number of instances of training identities 410, such as having training identity 410(14) or training identity 410 (348098541).

In implementations where additional modalities are used, the training data 402 for a training identity 410 may also include Mth modality image data 406(1) and associated sample ID 442(M) and modality label 444(M).

As mentioned above, the biometric input data may comprise information acquired using a variety of modalities. For example, these modalities may include one or more of images, fingerprint data, audio data, motion data, depth data, or other data that is representative of one or more features of the user.

Figure 5:
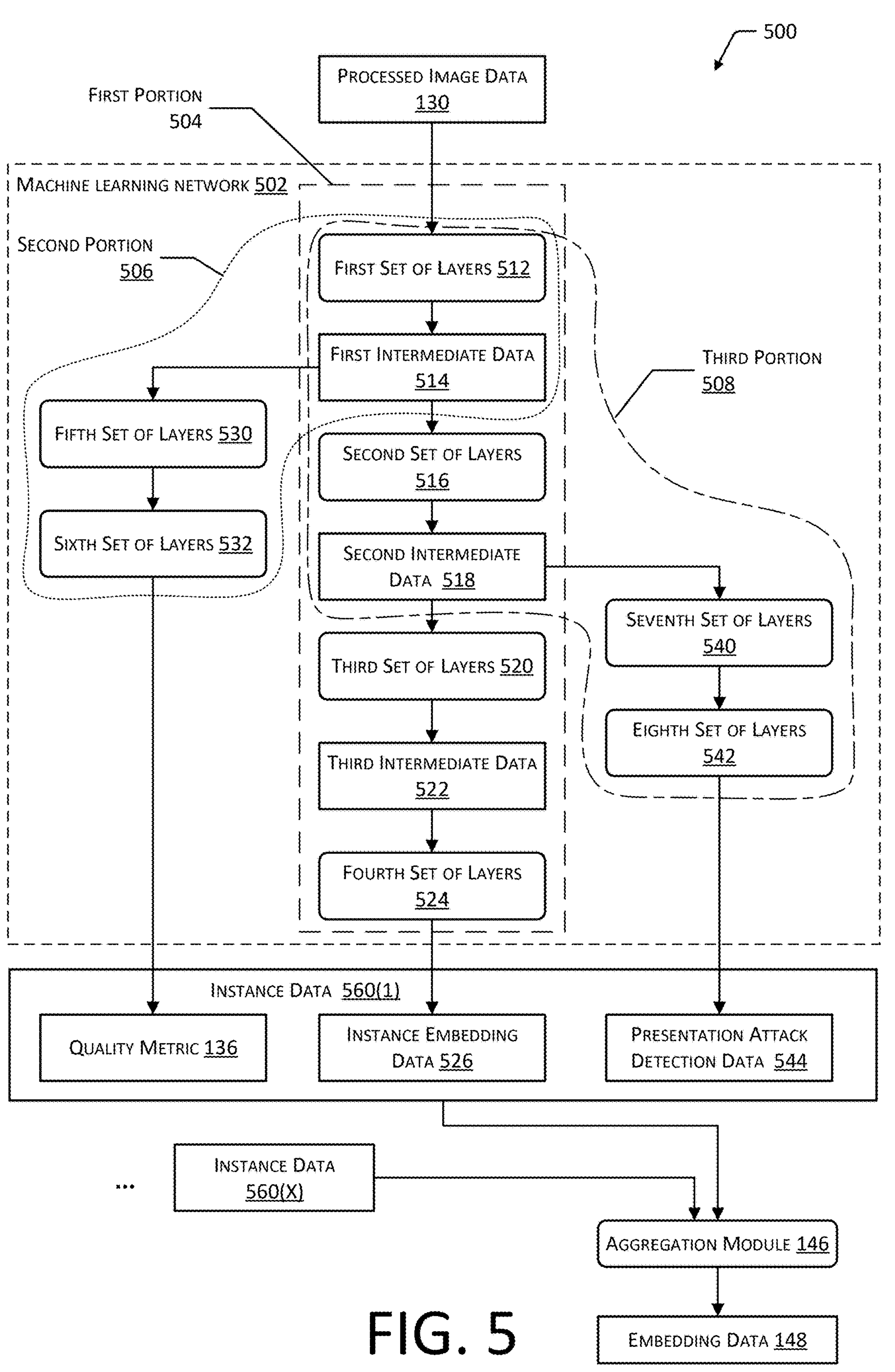
FIG. 5 illustrates a machine learning network with branches to process biometric input and determine quality metrics and embedding data, according to some implementations.

FIG. 5 illustrates at 500 a machine learning network 502 with branches to process biometric input and determine quality metrics 136 and embedding data 148, according to some implementations.

The machine learning network (MLN) 502 in this illustration includes a first portion 504, a second portion 506, and a third portion 508. In some implementations the MLN 502 may have additional portions (not shown) or fewer portions. The machine learning network 502 may utilize a deep learning convolutional neural network architecture comprising a plurality of layers providing different functions. For example, convolutional layers may perform convolution operations, information restriction layers may perform information restriction operations such as selectively discarding some information, pooling layers may perform pooling operations, fully connected (FC) layers may have each network element in that layer connected to network elements in an adjacent layer, a squeeze-and-excitation (SE) layer may model channel relationships and channel interdependencies, and so forth. Output from a set of layers that is provided to another set of layers during operation may be deemed intermediate data.

Input data to the MLN 502 may comprise the processed image data 130 provided by the image processing module 120. For example, the MLN 502 may accept as input aligned image data 124, patch data 128, and so forth.

The first portion 504 provides as output instance embedding data 526. The second portion 506 provides as output the quality metrics 136. The third portion 508 provides as output presentation attack detection data 544. The presentation attack detection data 544 is indicative of whether the hand 102 that is depicted is deemed to be an artifact or an actual human hand.

The first portion 504 of the MLN 502 may comprise a first set of layers 512 that accepts the processed image data 130 as input and determines first intermediate data 514. The first intermediate data 514 is then processed by a second set of layers 516 that determines second intermediate data 518. The second intermediate data 518 is then processed by a third set of layers 520 that determines third intermediate data 522. The third intermediate data 522 is then processed by a fourth set of layers 524 that determines instance embedding data 526. The instance embedding data 526 comprises embedding data representative of the features present in the processed image data 130. For example, if the processed image data 130 comprises an entire image, the instance embedding data 526 represents features in the entire image. In another example, if the processed image data 130 comprises patch data 128, the instance embedding data 526 represents features in the embedding patch 324.

In one implementation, the first set of layers 512 may comprise a convolutional two-dimensional layer, followed by thirteen information restriction layers. The second set of layers 516 may comprise three information restriction layers. The third set of layers 520 may comprise an information restriction layer followed by a convolutional two-dimensional layer. The fourth set of layers 524 may comprise two information restriction layers, followed by a polling layer, and a fully connected layer. In other implementations, other layer arrangements may be used.

The second portion 506 is a branch from the first portion 504, and may be considered to comprise the first set of layers 512, a fifth set of layers 530, and a sixth set of layers 532. The fifth set of layers 530 may comprise an information restriction layer followed by a convolutional two-dimensional layer. The sixth set of layers 532 may comprise three information restriction layers, followed by a pooling layer, followed by two fully connected layers.

The quality metrics 136 provided by the second portion 506 are representative of the quality of the processed image data 130. For example, if the processed image data 130 comprises an entire image, the quality metric 136 represents the quality of the entire image. In another example, if the processed image data 130 comprises patch data 128, the quality metrics 136 represent the embedding patch 324.

The third portion 508 is a branch from the first portion 504, and may be considered to comprise the first set of layers 512, the second set of layers 516, a seventh set of layers 540, and an eighth set of layers 542. The seventh set of layers 540 may comprise an information restriction layer followed by a convolutional two-dimensional layer. The eighth set of layers 542 may comprise a first squeeze-and-excitation (SE) layer, an information restriction layer, a second SE layer, a pooling layer, and one or more fully connected layers.

The presentation attack detection data 544 provided by the third portion 508 is associated with the processed image data 130. For example, if the processed image data 130 comprises an entire image, the presentation attack detection data 544 provides information as whether the entire image is of a hand or an artifact. In another example, if the processed image data 130 comprises patch data 128, the presentation attack detection data 544 represents whether the embedding patch 324 is of a hand or an artifact.

In the architecture depicted, the first intermediate data 514 is provided as input to the fifth set of layers 530. Also shown is that the second intermediate data 518 is provided as input to the seventh set of layers 540. This allows a significant reduction in processing latency and a reduction in computational resources compared to other approaches. For example, compared to using other algorithms to calculate the minutiae points and the density, the estimation provided by the second portion 506 requires less time and fewer computational resources.

The MLN 502 may provide as output instance data 560 comprising the instance embedding data 526, the quality metrics 136, and other data such as the presentation attack detection data 544. In some implementations, some portions of the instance data 560 may be completed before others. For example, the quality metric 136 and the presentation attack detection data 544 may be completed before the instance embedding data 526.

In some implementations, a plurality of instance data 560(1)-(X) may be processed by the aggregation module 146 to determine the embedding data 148. The aggregation module 146 may comprise a second machine learning network. In some implementations, the MLN 502 may include the functionality associated with the aggregation module 146.

The aggregation module 146 may comprise a machine learning network that has been trained to take instance data 560 as input and determine embedding data 148 as output. In one implementation, the aggregation module 146 may comprise a transformer network architecture that extracts features from the instance embedding data 526 provided as input and aggregates them using one or more multi-head self-attention blocks to generate embedding data 148 having a fixed length.

The aggregation module 146 may be trained to determine embedding data 148 using a subset of the instance data 560(1)-(X). For example, the aggregation module 146 may be trained to provide embedding data 148 in the event one or more instances of instance data 560 are deemed to be unusable. For example, if the quality metrics 136 associated with particular instance embedding data 526 is less than a threshold value, the particular instance embedding data 526 may be disregarded. In another example, if the presentation attack detection data 544 indicates that the associated instance embedding data 526 is an artifact, the associated instance embedding data 526 may be disregarded.

Training of the MLN 502 comprises the determination of trained model data. The trained model data may comprise one or more of the values associated with operation of elements of the network, such as node weights, bias values, and so forth. The trained model data may be determined during training resulting from multiple passes of processing training data 402, in which during each pass a loss function is used to calculate a loss value indicative of how the input varies from the output. The loss value may be provided as feedback to vary the values. The trained model data embodies the results of the training.

In some implementations, training of the MLN 502 may be performed in stages. For example, the first portion 504 may be trained at a first time using the training data 402. Continuing the example, at a second time the first portion 504 may be "frozen" and the second portion 506 may be trained using the training data 402. Similarly, at a third time the first portion 504 and the second portion 506 may be frozen and the third portion 508 may be trained using the training data 402. During training, a frozen portion of the network does not change the associated trained model data. For example, while frozen and training, the values for network node weights, bias values, and so forth remain unchanged. In comparison, the portions that are being trained and are not frozen will experience changes to the trained model data responsive to feedback provided by loss values from a loss function.

During training, the training data 402 provided as input may be one or more of uncompressed data 404 or compressed data 406. For example, the MLN 502 may be trained using uncompressed data 404 and compressed data 406.

Figure 6:
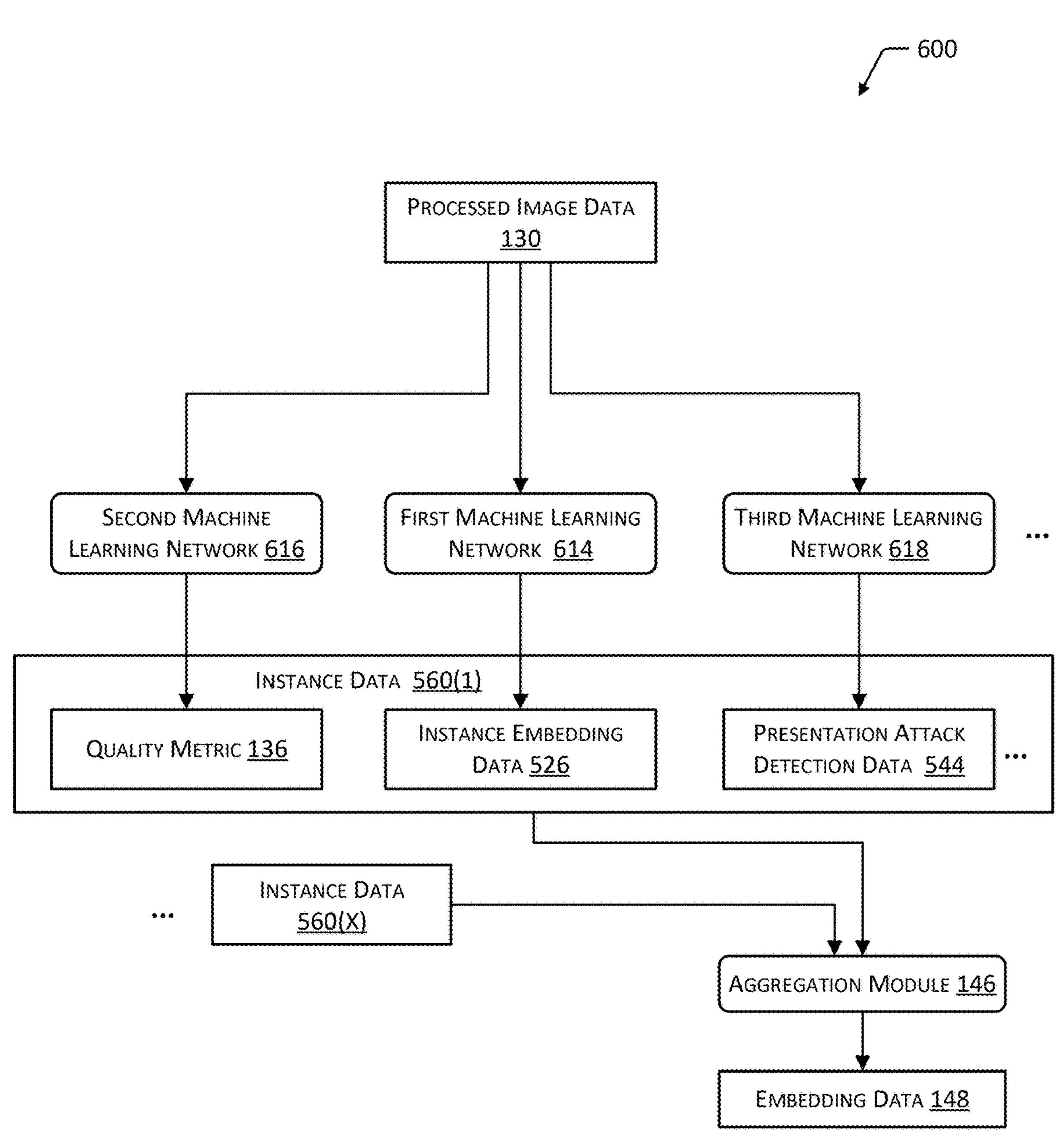
FIG. 6 illustrates a plurality of machine learning networks, a first to determine embedding data and a second to determine quality metrics, according to one implementation.

FIG. 6 illustrates at 600 a plurality of machine learning networks, a first to determine embedding data and a second to determine quality metrics, according to one implementation.

In contrast to the implementation depicted in FIG. 5, in this implementation the processed image data 130 is processed by a plurality of separate machine learning networks. As described above, the processed image data 130 may comprise one or more of aligned image data 124 or patch data 128.

A first machine learning network 614 accepts as input the processed image data 130 and determines instance embedding data 526.

A second machine learning network 616 accepts as input the processed image data 130 and determines quality metrics 136.

A third machine learning network 618 accepts as input the processed image data 130 and determines other information, such as presentation attack detection data 544.

In other implementations, additional machine learning networks may be used to determine other data 142.

As described above, the instance data 560(1)-(X) comprising instances of instance embedding data 526 and associated quality metrics 136, presentation attack detection data 544, and so forth may be provided to the aggregation module 146. The aggregation module 146 may then determine the embedding data 148.

Each of the machine learning networks 614, 616, 618, and so forth may be trained using the training data 402.

Figure 7:
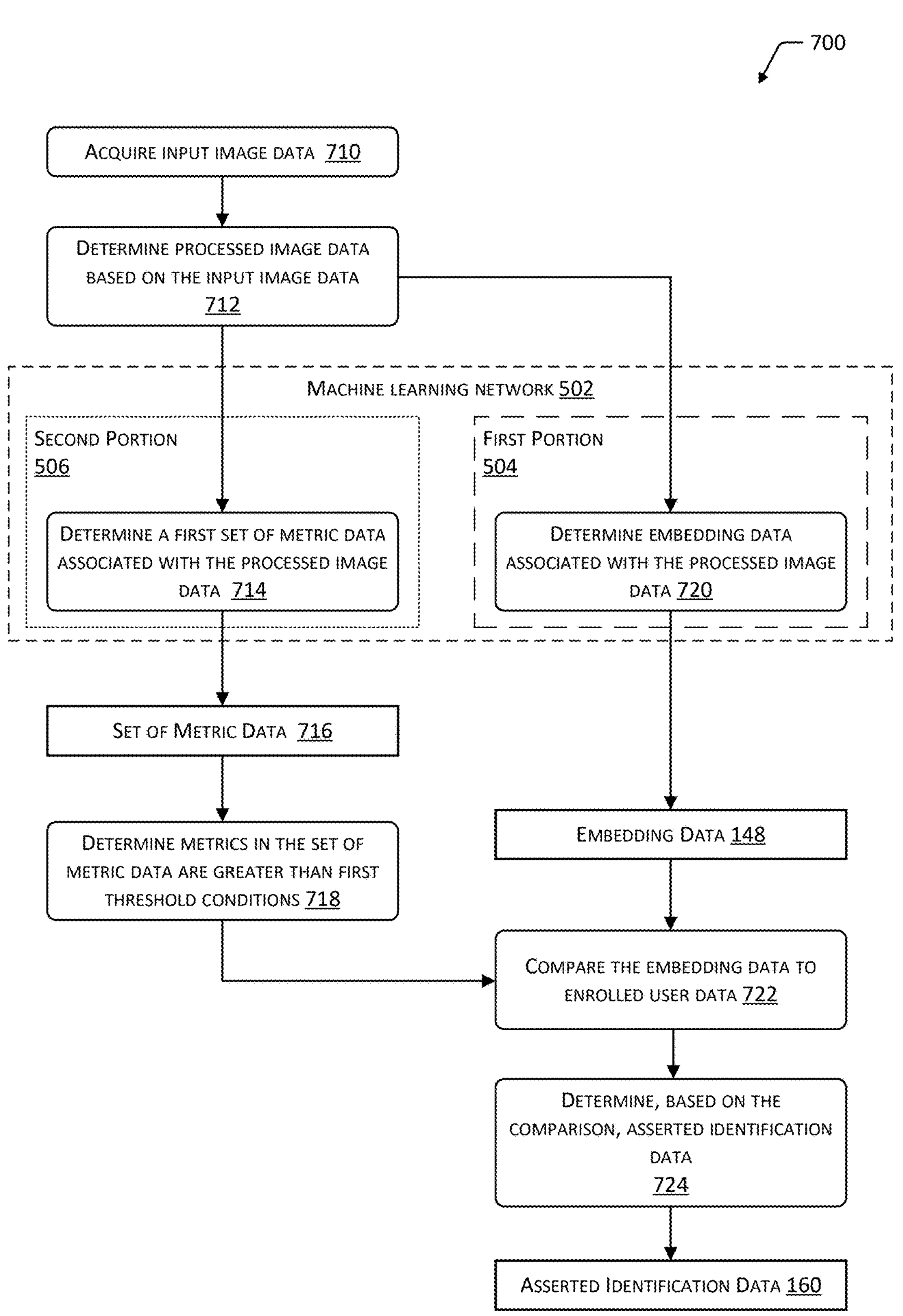
FIG. 7 illustrates a flow diagram of acquiring input image data, assessing the quality of the input, and determining asserted identification data, according to some implementations.

FIG. 7 illustrates at 700 a flow diagram of acquiring input image data, assessing the quality of the input, and determining asserted identification data 160, according to some implementations. The process may be implemented by one or more computing devices, such as the computing device 106, the computing device 156, and so forth.

At 710 input image data 112 is acquired. For example, the input device 104 acquires the input image data 112.

At 712 processed image data 130 is determined based on the input image data 112. For example, the input image data 112 is processed by the image processing module 120 to determine the processed image data 130.

At 714 a first set of metric data 716 is determined that is associated with the processed image data 130. At 720 embedding data 148 associated with the processed image data 130 is determined. As described above, the first set of metric data and the embedding data may be determined by the MLN 502. In some implementations, the first set of metric data 716 may be completed before, at the same time as, or after the embedding data 148 has been determined.

The processed image data 130 is provided as input to the MLN 502. As described above the first portion 504 of the MLN 502 determines instance embedding data 526 which may be used as the embedding data 148, or may be processed by the aggregation module 146 to determine the embedding data 148. As also described above, the second portion 506 provides as output quality metrics 136. A set of metric data 716 may be determined based on the output from the second portion 506. For example, the set of metric data 716 may comprise an overall or aggregated quality metric 136 associated with the instance data 560 used by the aggregation module 146 to determine the embedding data 148.

At 718 a determination is made that metrics in the set of metric data 716 comprises values that are greater than first threshold conditions. Different metric values may have different threshold values. Different threshold values may be specified for enrollment and identification. For example, higher thresholds of minutiae density and estimated feature point may be specified for enrollment, compared to later identification.

At 722 the embedding data 148 is compared to the enrolled user data 164. For example, the comparison module 158 may determine a top k closest, in the embedding space, instances of enrolled embedding data 168.

At 724, based on the comparison, asserted identification data 160 is determined. For example, the comparison module 158 may further determine that the embedding data 148 is less than a threshold distance in the embedding space from the enrolled embedding data 168(1938). The enrolled user data 164 maintains an association between individual instances of enrolled embedding data 168 and identification data 166. Based on this association, the identification data 166 (1938) is retrieved and used as the asserted identification data 160.

Figure 8:
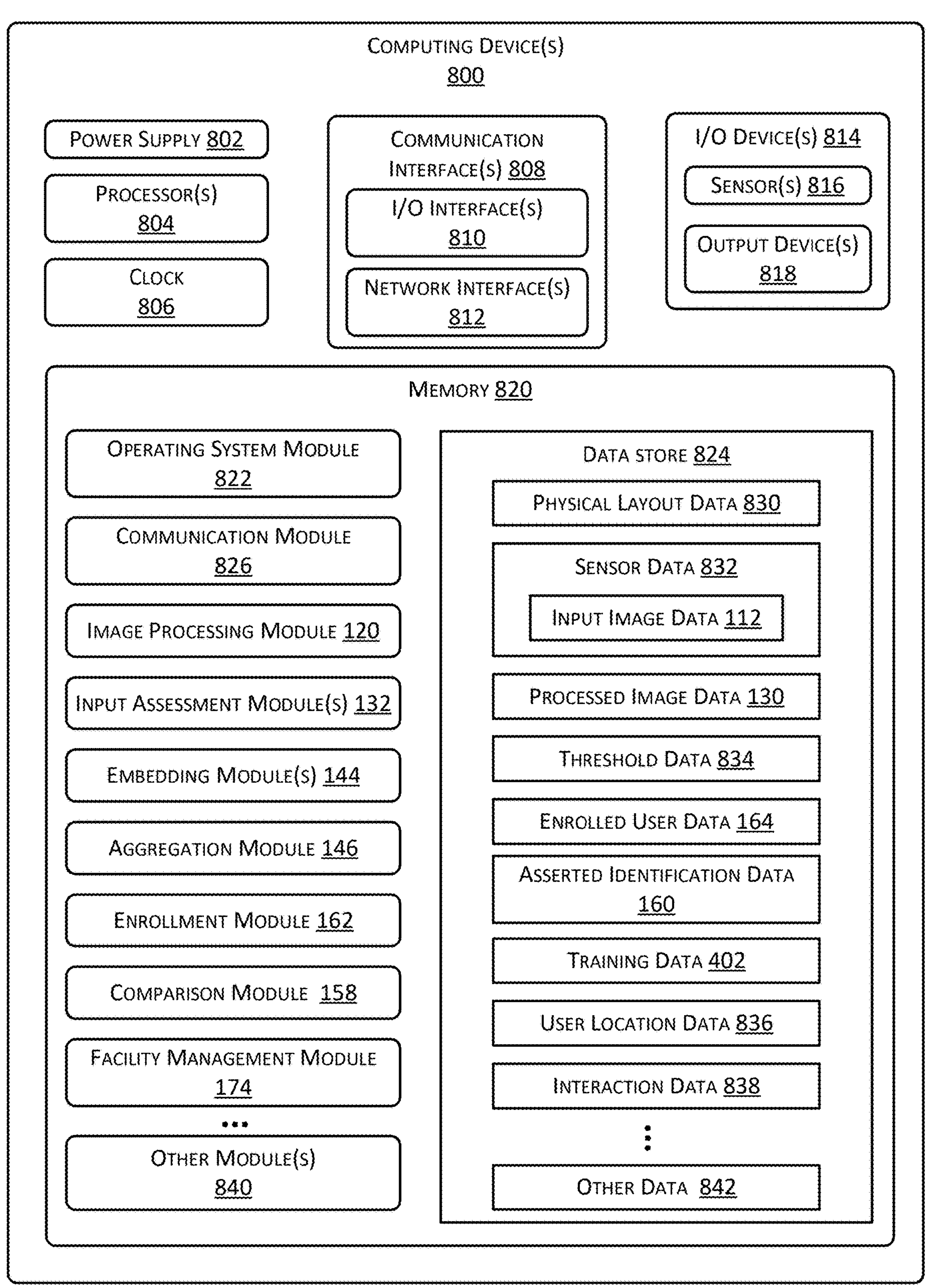
FIG. 8 is a block diagram of a computing device to execute at least a portion of the system, according to some implementations.

FIG. 8 is a block diagram of a computing device 800 to execute at least a portion of the system 100, according to some implementations. The computing device 800 may be physically present at the facility, may be accessible by a network, or a combination of both. The computing device 800 does not require end-user knowledge of the physical location and configuration of the system that delivers the services. Common expressions associated with the computing device 800 may include "embedded system", "on-demand computing", "software as a service (Saas)", "platform computing", "network-accessible platform", "cloud services", "data centers", and so forth. Services provided by the computing device 800 may be distributed across one or more physical or virtual devices.

One or more power supplies 802 may be configured to provide electrical power suitable for operating the components in the computing device 800. The one or more power supplies 802 may comprise batteries, capacitors, fuel cells, photovoltaic cells, wireless power receivers, conductive couplings suitable for attachment to a power source such as provided by an electric utility, and so forth. The computing device 800 may include one or more hardware processors 804 (processors) configured to execute one or more stored instructions. The processors 804 may comprise one or more cores. One or more clocks 806 may provide information indicative of date, time, ticks, and so forth. For example, the processor 804 may use data from the clock 806 to associate a particular interaction with a particular point in time.

The computing device 800 may include one or more communication interfaces 808 such as input/output (I/O) interfaces 810, network interfaces 812, and so forth. The communication interfaces 808 enable the computing device 800, or components thereof, to communicate with other devices or components. The communication interfaces 808 may include one or more I/O interfaces 810. The I/O interfaces 810 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 810 may couple to one or more I/O devices 814. The I/O devices 814 may include input devices such as one or more of a sensor 816, keyboard, mouse, input device 104, and so forth. The I/O devices 814 may also include output devices 818 such as one or more of a display device, printer, audio speakers, and so forth. In some embodiments, the I/O devices 814 may be physically incorporated with the computing device 800 or may be externally placed.

The network interfaces 812 may be configured to provide communications between the computing device 800 and other devices, such as input devices 104, routers, access points, and so forth. The network interfaces 812 may include devices configured to couple to personal area networks (PANs), local area networks (LANs), wireless local area networks (WLANS), wide area networks (WANs), and so forth. For example, the network interfaces 812 may include devices compatible with Ethernet, Wi-Fi, Bluetooth, ZigBee, and so forth.

The computing device 800 may also include one or more buses or other internal communications hardware or software that allow for the transfer of data between the various modules and components of the computing device 800.

As shown in FIG. 8, the computing device 800 includes one or more memories 820. The memory 820 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 820 provides storage of computer-readable instructions, data structures, program modules, and other data for the operation of the computing device 800. A few example functional modules are shown stored in the memory 820, although the same functionality may alternatively be implemented in hardware, firmware, or as a system on a chip (SoC).

The memory 820 may include at least one operating system (OS) module 822. The OS module 822 is configured to manage hardware resource devices such as the I/O interfaces 810, the I/O devices 814, the communication interfaces 808, and provide various services to applications or modules executing on the processors 804. The OS module 822 may implement a variant of the FreeBSD operating system as promulgated by the FreeBSD Project; other UNIX or UNIX-like variants; a variation of the Linux operating system; the Windows operating system from Microsoft Corporation of Redmond, Washington, USA; and so forth.

Also stored in the memory 820 may be a data store 824 and one or more of the following modules. These modules may be executed as foreground applications, background tasks, daemons, and so forth. The data store 824 may use a flat file, database, linked list, tree, executable code, script, or other data structure to store information. In some implementations, the data store 824 or a portion of the data store 824 may be distributed across one or more other devices including the computing devices 800, network attached storage devices, and so forth.

A communication module 826 may be configured to establish communications with one or more of the input devices 104, sensors 816, display devices, other computing devices 800, or other devices. The communications may be authenticated, encrypted, and so forth.

The memory 820 may also store one or more of the image processing module 120, input assessment module(s) 132, embedding module(s) 144, aggregation module 146, enrollment module 162, or the comparison module 158, as described above.

The memory 820 may store the facility management module 174. The facility management module 174 may perform various functions, such as tracking items between different inventory locations, to and from carts, generating restocking orders, directing operation of robots within the facility, using the asserted identification data 160 to associate a particular user identity with a user in the facility, and so forth. During operation, the facility management module 174 may access sensor data 832 such as one or more of image data from cameras, weight data from weight sensors, and so forth.

Information used by the facility management module 174 may be stored in the data store 824. For example, the data store 824 may be used to store physical layout data 830, sensor data 832, processed image data 130, threshold data 834, enrolled user data 164, asserted identification data 160, training data 402, user location data 836, interaction data 838, and so forth.

The physical layout data 830 may provide information indicative of where input devices 104, cameras, weight sensors, antennas for radio receivers, inventory locations, and so forth are in the facility with respect to one another. For example, the physical layout data 830 may comprise information representative of a map or floor plan of the facility with relative positions of gates with input devices 104 and inventory locations.

The sensor data 832 may comprise information obtained from one or more of the sensors 816 in or associated with the facility.

The enrolled user data 164 may comprise the embedding data 148 that is associated with particular user accounts. For example, the enrolled user data 164 may comprise stored enrolled embedding data 168(1) for user "Bob", enrolled embedding data 168(2) for user "Pat", and so forth.

The facility management module 174 may generate the user location data 836 that is indicative of the location of the user within the facility. For example, the facility management module 174 may use image data obtained by the cameras to determine a location of the user. In other implementations, other techniques may be used for determining the user location data 836. For example, data from a smart floor may be used to determine the location of the user.

A user identity may be associated with the user location data 836 based on the asserted identification data 160. For example, the user enters the facility and has their palm scanned, producing asserted identification data 160 that is indicative of their time of entry, an input device 104 associated with where they entered, and their user identifier. The user location data 836 indicative of a path of the user that begins at the input device 104 at the time of entry may be associated with the user identifier in the asserted identification data 160.

Based on the user location data 836 and the interaction data 838, a particular interaction may be associated with an account of a particular user. For example, if the user location data 836 indicates that the user is present in front of inventory location 492 at time 13:47:20 and the interaction data 838 indicates a pick of a quantity of one item from an area on inventory location 492 at 13:47:27, the user may be billed for that pick.

The facility management module 174 may use the sensor data 832 to generate the interaction data 838. The interaction data 838 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 174 may generate interaction data 838 that indicates what item the user picked from a particular lane on a shelf, and then use this interaction data 838 to adjust the count of inventory stowed at that lane. The interaction data 838 may then be used to bill an account associated with the user identifier that is associated with the user who picked the item.

The facility management module 174 may process the sensor data 832 and generate output data. For example, based on the interaction data 838, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 840 may also be present in the memory 820 as well as other data 842 in the data store 824. For example, a billing module may use the interaction data 838 and the asserted identification data 160 to bill an account associated with a particular user.

The devices and techniques described in this disclosure may be used in a variety of other settings. For example, the system may be used in conjunction with a point-of-sale (POS) device. The user may present their hand 102 to an input device 104 to provide an indication of intent and authorization to pay with an account associated with the asserted identification data 160. In another example, a robot may incorporate an input device 104. The robot may use the asserted identification data 160 to determine whether to deliver a parcel to the user, and based on the asserted identification data 160, which parcel to deliver.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:

one or more memories, storing computer-executable instructions; and one or more hardware processors to execute the computer-executable instructions to:

determine first image data acquired by an input device at a first time, wherein the first image data comprises image data associated with a palm of a user;

determine first embedding data based on processing the first image data using a first portion of a machine learning network;

determine a first set of metric data based on processing the first image data using a second portion of the machine learning network, wherein the first set of metric data comprises:

a first value indicative of density of a first type of features, and a second value indicative of density of a second type of features;

determine identification data;

determine that the first value is greater than a first threshold value;

determine that the second value is greater than a second threshold value; and based on the determination that the first value is greater than the first threshold value and the determination that the second value is greater than the second threshold value, store enrolled user data indicative of an association between the first embedding data and the identification data.

2. The system of claim 1, wherein:

the first value is indicative of an estimated minutiae density, and the second value is indicative of an estimated feature point density.

3. The system of claim 1, the one or more hardware processors to further execute the computer-executable instructions to:

determine second image data acquired at a second time;

determine second embedding data based on processing the second image data using the first portion of the machine learning network;

determine a second set of metric data based on processing the second image data using the second portion of the machine learning network, wherein the second set of metric data comprises:

a third value indicative of density of the first type of features, and a fourth value indicative of density of the second type of features;

determine one or more of:

the third value is greater than a third threshold value, wherein the third threshold value is less than the first threshold value, or the fourth value is greater than a fourth threshold value, wherein the fourth threshold value is less than the second threshold value; and based on the determination that the one or more of the third value is greater than the third threshold value, or the fourth value is greater than the fourth threshold value, determine asserted identification data indicative of the identification data based on a comparison of the second embedding data and the enrolled user data.

4. The system of claim 1, the one or more hardware processors to further execute the computer-executable instructions to:

determine first input image data acquired by the input device at the first time, wherein the first image data is determined based on the first input image data, and wherein the first image data is a portion of the first input image data and is associated with a predetermined spatial region of a hand.

5. The system of claim 1, the one or more hardware processors to further execute the computer-executable instructions to:

determine second image data;

determine second embedding data based on processing the second image data using the first portion of the machine learning network;

determine a second set of metric data based on processing the second image data using the second portion of the machine learning network; and determine, based on the first embedding data, the first set of metric data, the second embedding data, and the second set of metric data, third embedding data.

6. The system of claim 1, the one or more hardware processors to further execute the computer-executable instructions to:

determine first input image data acquired by the input device at the first time, wherein the first image data is determined based on the first input image data, and wherein the first image data is a first portion of the first input image data and is associated with a first spatial region of a hand;

determine, based on the first input image data, second image data, wherein the second image data is a second portion of the first input image data and is associated with a second spatial region of the hand;

determine second embedding data based on processing the second image data using the first portion of the machine learning network;

determine a second set of metric data based on processing the second image data using the second portion of the machine learning network; and determine, based on the first embedding data, the first set of metric data, the second embedding data, and the second set of metric data, third embedding data.

7. A computer-implemented method comprising:

determining first image data acquired by an input device at a first time, wherein the first image data comprises image data associated with a palm of a user;

determining first embedding data based on processing the first image data using a first portion of a machine learning network;

determining a first set of metric data based on processing the first image data using a second portion of the machine learning network, wherein the first set of metric data comprises:

a first value indicative of density of a first type of features, and a second value indicative of density of a second type of features;

determining that the first value and the second value in the first set of metric data are greater than first threshold conditions; and based on the determination that the first value and the second value in the first set of metric data are greater than the first threshold conditions, storing enrolled user data indicative of an association between the first embedding data and identification data associated with the user.

8. The method of claim 7, wherein:

the first value is indicative of an estimated minutiae density, and the second value is indicative of an estimated feature point density.

9. The method of claim 7, further comprising:

determining the identification data associated with the user;

determining that the first value is greater than a first threshold value; and determining that the second value is greater than a second threshold value, wherein the storing the enrolled user data indicative of the association between the first embedding data and the identification data is based on the determining that the first value is greater than the first threshold value and the determining that the second value is greater than the second threshold value.

10. The method of claim 9, further comprising:

determining second image data acquired at a second time;

determining second embedding data based on processing the second image data using the first portion of the machine learning network;

determining a second set of metric data based on processing the second image data using the second portion of the machine learning network, wherein the second set of metric data comprises:

a third value indicative of density of the first type of features, and a fourth value indicative of density of the second type of features;

determining one or more of:

the third value is greater than a third threshold value, wherein the third threshold value is less than the first threshold value, or the fourth value is greater than a fourth threshold value, wherein the fourth threshold value is less than the second threshold value; and based on the determining that the one or more of the third value is greater than the third threshold value, or the fourth value is greater than the fourth threshold value, determining, based on a comparison of the second embedding data and the enrolled user data, asserted identification data indicative of the identification data.

11. The method of claim 7, further comprising:

determining first input image data acquired by the input device at the first time, wherein the determining the first image data is based on the first input image data, and wherein the first image data is a portion of the first input image data and is associated with a predetermined spatial region of a hand.

12. The method of claim 7, further comprising:

determining second image data;

determining second embedding data based on processing the second image data using the first portion of the machine learning network;

determining a second set of metric data based on processing the second image data using the second portion of the machine learning network; and determining, based on the first embedding data, the first set of metric data, the second embedding data, and the second set of metric data, third embedding data.

13. The method of claim 7, further comprising:

determining first input image data acquired by the input device at the first time, wherein the determining the first image data is based on the first input image data, and wherein the first image data is a first portion of the first input image data and is associated with a first spatial region of a hand;

determining, based on the first input image data, second image data, wherein the second image data is a second portion of the first input image data and is associated with a second spatial region of the hand;

determining second embedding data based on processing the second image data using the first portion of the machine learning network;

determining a second set of metric data based on processing the second image data using the second portion of the machine learning network; and determining, based on the first embedding data, the first set of metric data, the second embedding data, and the second set of metric data, third embedding data.

14. A system comprising:

one or more memories, storing computer-executable instructions; and one or more hardware processors to execute the computer-executable instructions to:

determine first image data comprising a plurality of modalities acquired at a first time;

determine first embedding data based on the first image data;

determine a first set of metric data based on the first image data, wherein the first set of metric data comprises:

a first value indicative of density of a first type of features, and a second value indicative of density of a second type of features;

determine that the first value and the second value in the first set of metric data are greater than first threshold conditions; and responsive to the determination that the first value and the second value in the first set of metric data are greater than the first threshold conditions, store enrolled user data indicative of an association between the first embedding data and identification data associated with a user.

15. The system of claim 14, wherein:

the first value is indicative of an estimated minutiae density, and the second value is indicative of an estimated feature point density.

16. The system of claim 14, the one or more hardware processors to further execute the computer-executable instructions to:

determine the identification data associated with the user;

determine that the first value is greater than a first threshold value; and determine that the second value is greater than a second threshold value, wherein the storing of the enrolled user data indicative of the association between the first embedding data and the identification data is based on the determination that the first value is greater than the first threshold value and the determination that the second value is greater than the second threshold value.

17. The system of claim 16, the one or more hardware processors to further execute the computer-executable instructions to:

determine second image data acquired at a second time;

determine second embedding data based on the second image data;

determine a second set of metric data based on the second image data, wherein the second set of metric data comprises:

a third value indicative of density of the first type of features, and a fourth value indicative of density of the second type of features;

determine one or more of:

the third value is greater than a third threshold value, wherein the third threshold value is less than the first threshold value, or the fourth value is greater than a fourth threshold value, wherein the fourth threshold value is less than the second threshold value; and based on the determination that the one or more of the third value is greater than the third threshold value, or the fourth value is greater than the fourth threshold value, determine, based on a comparison of the second embedding data and the enrolled user data, asserted identification data indicative of the identification data.

18. The system of claim 14, the one or more hardware processors to further execute the computer-executable instructions to:

determine second image data;

determine second embedding data based on the second image data;

determine a second set of metric data based on the second image data; and determine, based on the first embedding data, the first set of metric data, the second embedding data, and the second set of metric data, third embedding data.

19. The system of claim 14, the one or more hardware processors to further execute the computer-executable instructions to:

determine first input image data acquired by an input device at the first time, wherein the first image data is based on the first input image data, and wherein the first image data is a first portion of the first input image data and is associated with a first spatial region of a hand;

determine, based on the first input image data, second image data, wherein the second image data is a second portion of the first input image data and is associated with a second spatial region of the hand;

determine second embedding data based on the second image data;

determine a second set of metric data based on the second image data; and determine, based on the first embedding data, the first set of metric data, the second embedding data, and the second set of metric data, third embedding data.

20. The system of claim 1, wherein:

the first embedding data is determined based on processing the first image data using a first portion of a machine learning network, the first portion of the machine learning network utilizes a first set of layers to determine first intermediate data and utilizes a second set of layers to determine second intermediate data, the first set of metric data is determined based on processing the first image data using a second portion of the machine learning network, and the second portion of the machine learning network utilizes the first intermediate data determined by the first portion of the machine learning network and utilizes a third set of layers to determine third intermediate data.

* * * * *